Sept. 2, 1952  H. C. ENGEL ET AL  2,609,314
MACHINE FOR MAKING HONEYCOMB CORE MATERIAL
Original Filed Oct. 30, 1946  4 Sheets—Sheet 1

Inventors
HARRY C. ENGEL,
WILLARD W. TROXELL,
THEODORE P. PAJAK,

By Donald W. Farrington
Attorney

Sept. 2, 1952 H. C. ENGEL ET AL 2,609,314
MACHINE FOR MAKING HONEYCOMB CORE MATERIAL
Original Filed Oct. 30, 1946 4 Sheets-Sheet 2
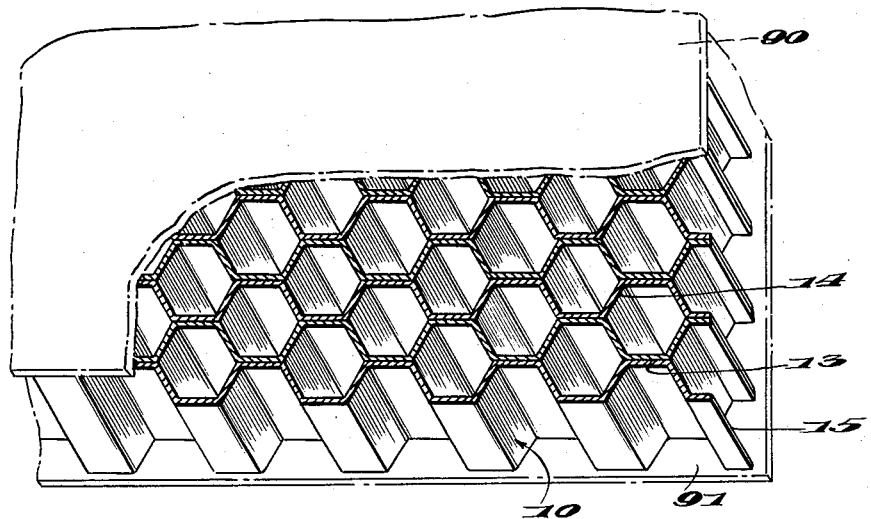
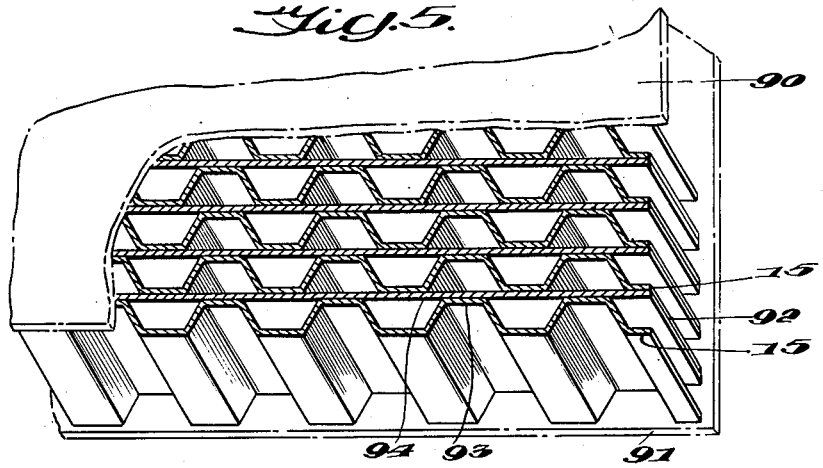
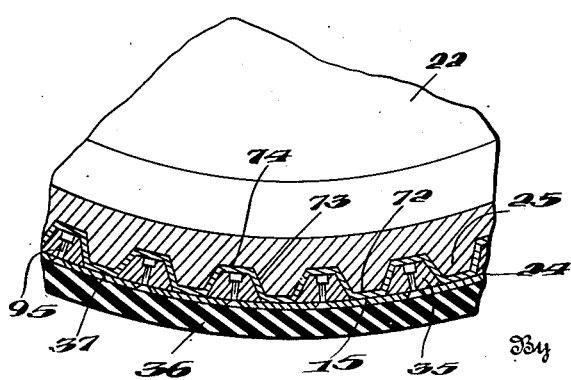
Inventors
HARRY C. ENGEL,
WILLARD W. TROXELL,
THEODORE P. PAJAK,
By Donald W. Farrington
Attorney Sept. 2, 1952     H. C. ENGEL ET AL     2,609,314
MACHINE FOR MAKING HONEYCOMB CORE MATERIAL
Original Filed Oct. 30, 1946     4 Sheets-Sheet 3
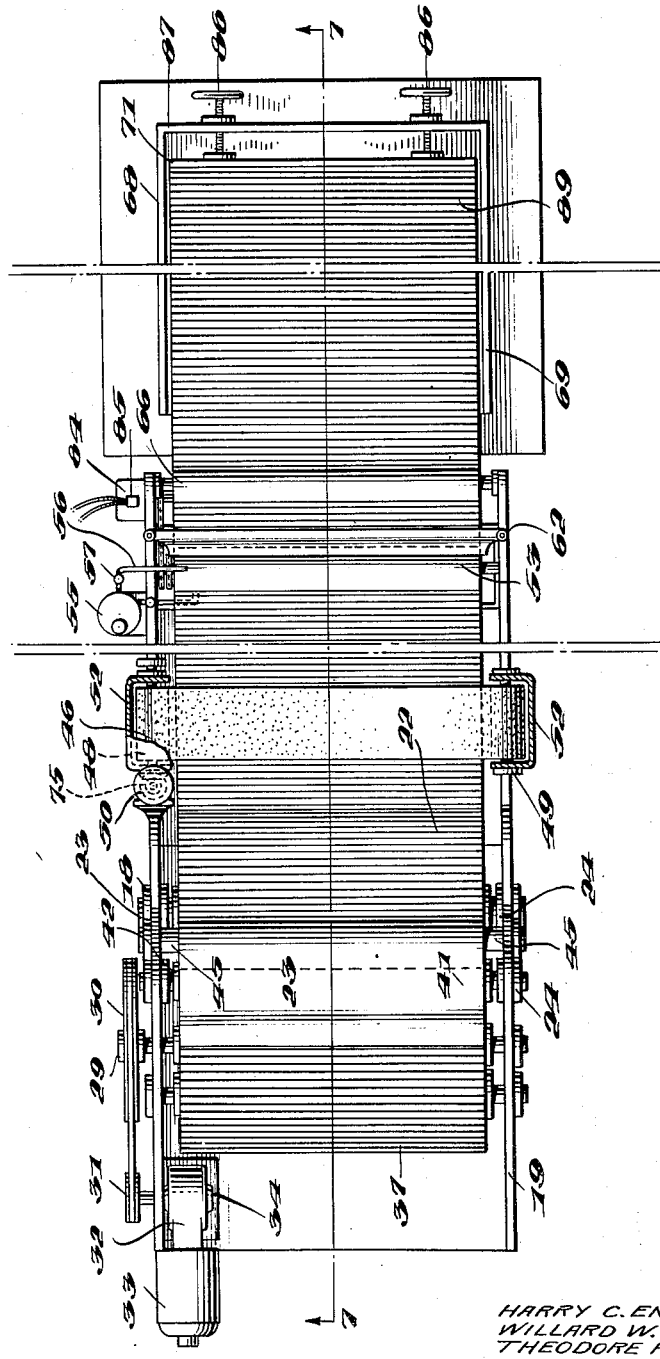
Inventors
HARRY C. ENGEL,
WILLARD W. TROXELL,
THEODORE P. PAJAK,
By Donald W. Farrington
Attorney

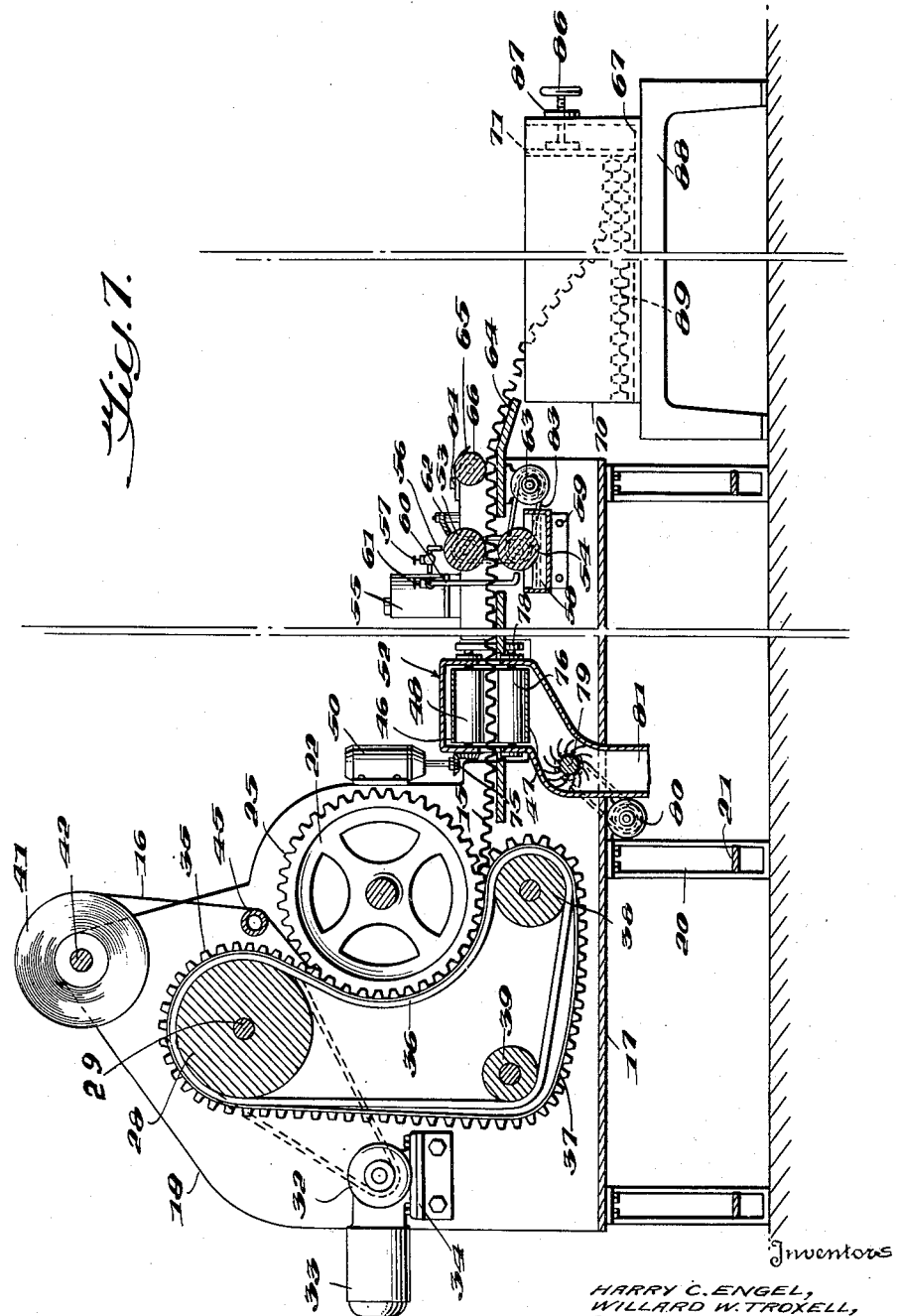

Patented Sept. 2, 1952

2,609,314

UNITED STATES PATENT OFFICE 2,609,314

MACHINE FOR MAKING HONEYCOMB CORE MATERIAL

Harry C. Engel, Towson, and Willard W. Troxell and Theodore P. Pajak, Baltimore, Md., assignors to The Glenn L. Martin Company, Middle River, Md., a corporation of Maryland Original application October 30, 1946, Serial No. 706,672. Divided and this application January 31, 1951, Serial No. 208,700

4 Claims. (Cl. 154—30)

Our invention relates to a machine for making a honeycomb core structure from relatively thin strips of resin impregnated material, or the like.

This is a division of application Serial No. 706,672 filed October 30, 1946, now abandoned.

The present invention provides an efficient machine for forming honeycomb core material in which relatively dense high-strength fabric strips are arranged to form hexagonal shaped cells in which the full strength of the walls of said cells are utilized to produce tensile and compressive strength in the direction of the cell axis by the provision of double and single ply wall formations in a structure characterized by having an extremely low specific gravity.

An object of our invention is to provide a machine for making honeycomb core material in which resin impregnated fabric material is fed through a heating area, drawn between forming ribs carried in meshed relationship to each other so as to shape the heated resin impregnated material and retain the material to the form into which it has been shaped for a sufficient length of time to allow it to set after which it is prepared for bonding, cut, assembled for bonding and curing as a continuous operation.

Another object of this invention is to provide a continuous shaping machine capable of inexpensively producing core material in which resin inpregnated material is shaped and formed as strips suited for bonding together at predetermined points to form a cellular structure.

Other objects of this invention will become apparent from the following description when taken in conjunction with the accompanying drawings in which like numbers refer to like parts in different views of the drawings.

Figure 4 is a fragmentary perspective of the core material showing its preferred embodiment as a stabilizer between two metal surface sheets.

Figure 5 is a fragmentary perspective of the core having a modified form of cell structure.

Figure 6 is a top plan view of the strip shaping machine.

Figure 7 is a sectional view of the machine on line 7—7 of Figure 6.

Figure 8 is an enlarged fragmentary sectional view of the shaping ribs and bars showing their meshed positions.

Figure 1:
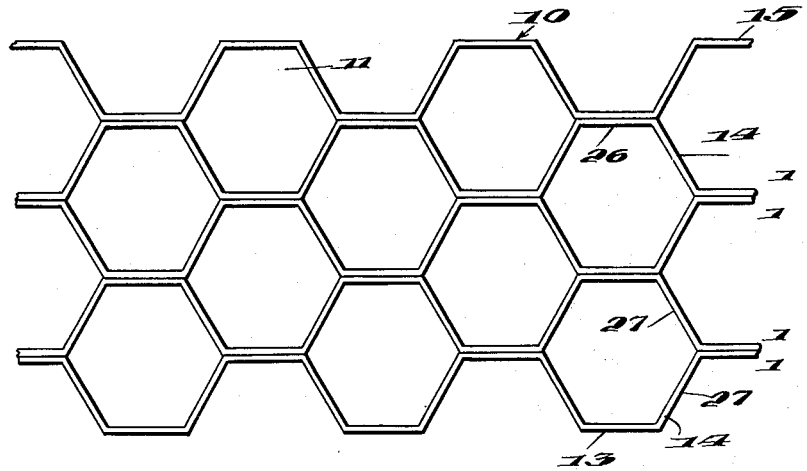
Figure 1 is an enlarged fragmentary sectional view of the honeycomb core structure of this invention showing arrangement of the walls of each cell.
Figure 2:
Figure 2 is an enlarged fragmentary sectional view of the strip material prior to shaping.
Figure 3:
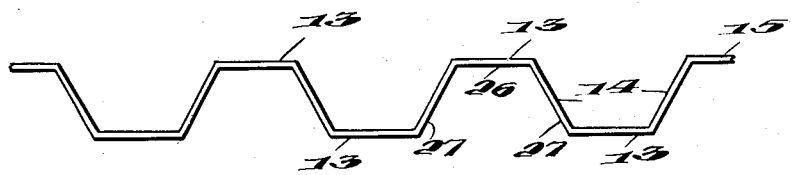
Figure 3 is an enlarged fragmentary sectional view of the same strip shaped ready for assembly.

Referring now to Figure 1, we have illustrated a fragment of the core structure 10 which shows the arrangement of the cell walls attained in the finished article. Core structure 10 is comprised of a plurality of hexagonal shaped cells 11 having a pair of opposed walls of double thickness and two pairs of opposed walls of single thickness formed of suitable flexible material rendered formable by being impregnated with a suitable theremosetting resin. Most satisfactory results have been obtained by the use of fabric sheets impregnated with a phenol-formaldehyde to a resin content of about 50% by weight which has been partially cured prior to being cut to the desired width for shaping. The fabric in its pre-shaped form is illustrated in Figure 2 as a flat sheet 12. This flat sheet 12 is cut into the form of a continuous strip 16 suited for handling as a roll and adapted for shaping in the continuous shaping machine hereinafter described to provide the shaped strip 15 as shown in Figure 3, having bond areas 13 longitudinally spaced apart and positioned above and below the center line of the original sheet. The intervening areas between the bond areas 13 are shaped to form the sloped wall areas 14 as best illustrated in Figure 3. This configuration of the alternate bond areas 13 and wall areas 14 may also be referred to as formations representing one-half of the hexagonal shaped cell 11 of the finished core assembly.

The machine of this invention is shown by Figures 6 and 7 mounted on a heavy rigid frame structure of conventional design having a bed plate 17 extending between upright sidewall members 18 and 19 raised above the floor level and supported by suitable channeled legs 20 arranged in pairs. Cross members 21 positioned between and welded to the legs add additional rigidity to the structure.

Side wall members 18 and 19 are extended upwardly to receive a removable roller 42 adapted to position the roll 41 of strip material 16 for aligned feeding of the strip into the shaping mechanism. The strip shaping mechanism of the machine is comprised of a large cylinder 22 mounted transversely to the bed plate 17 with bearings 23 and 24 carried by the side wall members 18 and 19. Around the outer periphery of cylinder 22 a plurality of shaping ribs 25 are provided in the form of gear teeth. Each rib 25 is formed with a flat top 72 (Figure 8) and sloping sides 73 separated by a flat bottom land 74 equal in width to that of each top, it being intended that the geometry of each rib be that of one-half of a hexagonal.

The flat top surfaces 72 of the ribs 25 are shaped and dimensioned so as to produce the flat areas 26 in one side of the shaped strip 15 (Fig. 3) spaced between the bond areas 13, likewise the sloping side areas 73 correspond to the interior of the sloped wall areas 14 of the shaped strip. The bottom land areas 74 between the ribs correspond to the bond areas 13 as formed on one side of the shaped strip 15.

A driving roller 28 is spaced from the large cylinder 22 a sufficient distance to allow for meshed engagement of the ribs 25 with bars 35 corresponding in shape and size with ribs 25 and carried by a flexible endless conveyor 37. The driving roller 28 is secured to drive shaft 29 journaled in suitable bearings carried by the side walls with one end of the shaft extended beyond the side wall 18 to allow for drive attachment of pulley 30. Pulley 30 is adapted for belt, or like drive, through a second pulley 31 of a speed reduction drive mechanism 32 powered by an electric motor 33 supported by a bracket 34 bolted to side wall 18. Speed reduction unit 32 is preferably of a variable speed type, however, any conventional unit of the proper power output capable of being operated at a certain predetermined speed will prove satisfactory. Cross bars 35 corresponding in length and shape to ribs 25 are spaced and mounted on a non-stretchable flexible fabric endless conveyor belt 37 so as to provide for loose meshed engagement with the shaping ribs 25 carried by the large cylinder 22. Each one of the cross bars 35 is affixed to belt conveyor 37 by screw bolts 95, or like means, inserted through the belt material. The conveyor belt 37 is in turn supported and held in position by a stretchable endless supporting belt 36 formed of rubber or like material adapted for encirclement of the driving roller 28 and positioning roller 38 positioned under the large cylinder 22. The supporting belt is maintained at the proper operating tension by an adjustable idler 39 mounted back of the positioning roller to hold the cross bars 35 of the conveyor belt 37 in meshed position with shaping ribs 25 for a predetermined distance around the outer periphery of the large cylinder 22. In this manner a shaping means is provided capable of maintaining a firm but resilient engagement between the shaping ribs of the large cylinder and the bars carried by the endless conveyer belt respectively. The shaping ribs 25 and bars 35 being maintained in fixed position relative to each other provide the sloped sides and flat top and bottom shaping areas in uniform engagement for a predetermined distance. The distance determined being sufficient to allow for the strip 16 of thermosetting resin impregnated fabric rendered formable by application of heat to be shaped to the contour of the shaping members and to be held to such shape until cooled sufficiently to become fixed as a continuous operation. This arrangement of a resilient supporting belt positioned to "back up" the shaping cross bars 35 and thereby hold them in constant meshed relationship with the ribs 25 for the required shaping distance prevents any tendency that the endless conveyor belt 37 might otherwise have to sag away from the large cylinder 22.

For convenience of feeding, the resin impregnated strip 16 is wound into a roll 41 and placed above the shaping mechanism on roller 42 mounted between the side walls from whence the material can be readily unrolled as needed. The strip 16 is then carried through a heating area represented by heating unit 45 (Figures 6 and 7) which may consist of an electric heating coil, a bank of lamps, or like heating means of sufficient capacity to heat the strip to from 350° F. to 375° F. at which temperature it is rendered formable and suited for feeding between shaping ribs 25 and cross bars 35 which mesh sufficiently to draw the strip in its heated condition therebetween and hold it to the desired shape while advancing the strip to the point where the meshed members separate, moving the strip material, which in its shaped condition is illustrated and referred to as shaped strip 15 (Figure 7), outwardly away from the meshed shaping members onto the platform of the machine. The shaped strip 15 is then in proper condition for further fabrication except for possible slight irregularities and a glaze which customarily forms on the surface of the strip due to the curing characteristics of the thermosetting resin and in those instances where an extremely close bond is desired we have found it desirable to remove said irregularities and glaze by means of a suitably mounted sanding mechanism. We are aware, however, that certain improved high strength adhesives may eliminate the need for the sanding operation. The sanding mechanism consists of a pair of endless sanding belts mounted for crosswise operation in contact with the top and bottom bond areas 13 of the shaped strip 15 as it is moved along the machine platform 64. By operation of the sanding belts crosswise of the strip 15 the flat bond areas 13 are worked parallel to their sloped walls whereby the inherent stiffness of the walls is utilized to secure evenly sanded surfaces. The top sanding belt 46 (Figures 6 and 7) is positioned to move crosswise of strip as an endless belt in a given direction around a pair of top rollers 48 and 49 provided with suitable bearings carried by the machine side walls. The bottom sanding belt 47 is similarly mounted for movement in the opposite direction to engage the bottom side of the strip on a pair of bottom rollers 76. Power for the operation of the sander is provided by an electric motor 50 suitably mounted to provide for direct drive through a set of pinion gears 75. The bottom sanding belt 47 is driven in the opposite direction by the same motor by means of a pulley mounted on the end of the shaft of top roller 48 and a like pulley mounted on the bottom roller 76 connected by a belt 78. The sander is enclosed in a suitable housing 52 and provided with an exhaust fan 79 driven by an electric motor 80 for conduction of the resin dust produced by the sander away from the machine through outlet 81.

In order to provide for bonding of the strips together, it is necessary that a second coating of thermosetting resin be applied to the bond areas 13 and this is accomplished by introducing the shaped strip 15 to a suitable wetting mechanism which we have illustrated as a double acting spreader having a top spreader roll 53 and bottom spreader roll 54 mounted for contact with the moving strip to apply a solution of bond material to the areas prepared for bonding on both sides of the strip as it passes therebetween. A reservoir for the bonding material solution is provided by a supply tank 55 mounted on the side wall 18 of the machine. Conveyance of the resin from the supply tank to the top roll 53 is provided for by a duct 56 equipped with a shutoff valve 57. A supply of resin to the bottom roll 54 is provided for by a dip tray 58 arranged for partial submersion of the spreader roll in the fluid supplied thereto. Resin is conveyed from the supply tank 55 to the dip tray 58 by a second duct 60 provided with a control valve 61. The level of resin in the tray may be automatically maintained at the right point by means of a float system (not shown) if desired. Dip tray 58 is supported under the bottom spreader 54 by a suitable support bracketed to the side walls such as cross member 59. Excess resin is scraped from the top spreader roll by means of a scraper 62. No scraper is needed for the bottom roll as when operated under normal conditions there is no tendency of the strip to pick up excess resin. Rotation of the spreader rolls 53 and 54 is accomplished by a suitably geared electric motor 63 supported from the platform 64 and connected to the spreader rolls by belted drive 83.

Cutting of the continuous shaped strip 15 into suitable lengths for use is accomplished by means of a knife 65 provided with a biased cutting edge mounted on a rotatable drum 66 arranged for timed operation by an electric motor 84 (Figure 6) controlled by means of a micro-switch 85. In this manner the material can be cut to any desired lengths, however, in producing honeycomb construction material 10 for commercial panels, a time setting suited to cut the strip to either 4, 6 or 8 foot lengths would be utilized.

The cut lengths of the shaped strips 15 are in proper position as they move from the knife to be dropped into an assembly rack or box conventionally placed at the end of the machine platform 64 supported by a table 88. The assembly rack is provided with a floor 67, sides 68 and 69, fixed end 70, and an adjustable end 71. The adjustable end 71 is suitably positioned by means of adjusting screws 86 mounted in an end brace 87 to provide for proper placement, either by hand or by an automatic handling device (not shown), of the strips in stacked relationship so that the flat surfaces that provide the bond areas 13 of each strip will fall on the bond areas of each preceding strip to provide a series of hexagonal cells therebetween. After a suitable number of strips have been assembled a top plate (not shown) adapted to hold the strips in assembled position with the bond areas 13 in contact with each other is placed on top of the assemblage 89. The assembled strips are then bonded together at the bond areas by the application of sufficient heat to completely cure the second coating of thermosetting resin applied to the strips by the spreader.

The assemblage 89, after cooling, represents the bonded cellular structure referred to as core 10 and is then in condition for cutting or shaping to any specific thickness required. In the economical production of core, we have found it advisable to form material to substantially the full width capacity of the shaping machine. Such an assemblage is well suited for cutting into sheets of any desired thicknesses on regular wood working equipment. Furthermore, it can be stored for further working and sizing as the need arises.

In the operation of our improved continuous form shaping machine, it is understood that the quantity of material carried in the roll may be varied as production demands warrant. The speed of production may also be increased by increasing the amount of heat supplied to the strip 16 and by providing some form of mechanical cooling means to speed up curing of the thermosetting resin carried by the strip after shaping. While we have avoided showing use of special cooling means for purposes of simplicity, it has been found practicable to speed up production of material to a rate of approximately forty feet per minute by use of such means. For the same reason any showing of disconnecting means is omitted from the driving mechanism, it being understood, of course, that in some instances it would be considered advisable to equip the machine with a conventional form of clutch controlled drive as well as conventional overload release controls.

Operation of the machine in the construction of cellular core material is as follows:

A continuous strip 16 of flexible thermosetting resin impregnated material cut to suitable width for passing through the machine is rolled and placed on shaft 42. The free end of the strip 16 is passed under the heating unit 45 energized from a suitable source of electrical supply current and placed in contact with cylinder 22. The main driving motor 33 is energized from a supply line (not shown) which in turn rotates the driving roller 28 moving shaping cross bars 35 affixed to conveyor belt 37 into meshed engagement with shaping ribs 25 positioned around the outer periphery of cylinder 22. The free end of strip 16 is thereby drawn between the shaping members and so shaped to their configuration, having been rendered formable by the heat supplied by heating unit 45. The function of endless belt 36 is not only to act as a driving medium upon which conveyor belt 37 rides but also a support and holding means to hold the shaping members in position long enough for the resin carried by the strip material to cool and fix the shape of the strip to that of the shaping members. Having been so shaped, the strip material emerges as shaped strip 15 formed with a series of flat areas equally displaced outwardly from the center line of the original strip. Any irregularities as well as the glazed resin surface formed by the resin are removed from these flat areas by the sanding belts 46 and 47 mounted and driven so as to move in opposite directions across said flat areas herein referred to and shown as bond areas 13. The shaped strip 15 is then passed between resin spreading rolls 53 and 54 which place a fresh coating of thermosetting resin on said bond areas 13 preparing them for bonding together. The strip is then cut into suitable lengths by a cutting knife 65 arranged to operate at spaced intervals. The cut sections of strip 15 are then stacked either by hand or mechanically in a receiving form with the bond areas 13 together to form an assemblage 89 of stacked strips after which the assemblage is heated to substantially 300° F. for about 15 to 20 minutes to completely cure and bond said strips together to form the stiff cellular core 10.

Our invention is capable of many modifications within the scope of this specification and is therefore not intended to be limited to the precise arrangement shown nor otherwise than as set out in the following claims.

We claim as our invention:

1. A machine for forming core material from a strip of partially cured phenolic resin impregnated fabric comprising a base frame having side members and a work platform, a material support means positioned for delivery of the fabric strip, a heater positioned to heat the strip, a revolvable cylinder mounted transversely of the work platform having regularly spaced members shaped as half-hexagonals mounted crosswise around the outer periphery of said cylinder, an endless conveyer belt, a plurality of members shaped as half-hexagonals mounted on the conveyor belt crosswise thereto and spaced for meshed engagement with the similarly formed members of the revolvable cylinder, a resilient drive belt positioned to carry the conveyer belt in meshed engagement with said cylinder for a predetermined enwrapped distance, drive means connected to the drive belt for maintaining successive meshed engagement between the half-hexagonal members to progressively work, shape and fix the shape of the heated strip as a series of half-hexagonals having flat bond areas equally disposed from a median plane.

2. A machine for corrugating partially cured resinous core material comprising a frame, a heater carried by said frame, a material feed means carried by said frame for feeding a strip of phenolic resin impregnated fabric adjacent the heater, a pair of opposed corrugation forming elements arranged to receive the heated strip therebetween, each comprising a continuous series of matched half-hexagonally shaped members arranged for meshed engagement with one another with the strip therebetween, one of said corrugation forming elements being in the form of a flexible endless belt, a resilient drive belt arranged to urge the flexible endless belt into meshed engagement with the other of said corrugation forming elements throughout a substantial portion of the peripheral length thereof whereby said strip is corrugated and held between said corrugation forming elements until the strip is cooled and fixed in shape, and drive means operatively connected to the resilient belt to move the members into successive engagement and advance the shaped strip.

3. A machine for corrugating a strip of partially cured phenolic resin impregnated fabric material comprising a frame, a heater carried by said frame, a material feed means carried by said frame for feeding said strip of phenolic resin impregnated fabric adjacent the heater, a pair of opposed corrugation forming elements arranged to receive said heated strip therebetween, each comprising a continuous series of matched half-hexagonally shaped members arranged for meshed engagement with one another with the strip therebetween, one of said corrugation forming elements being in the form of a flexible endless belt, and means for driving said opposed corrugation forming elements and for urging them into meshing relationship with one another including a resilient belt arranged to urge the flexible endless belt into meshed engagement with the other of said corrugation forming elements throughout a substantial portion of the peripheral length thereof whereby said strip is corrugated and held between said members until the strip is cooled and fixed in shape.

4. A machine for corrugating a strip of partially cured phenolic resin impregnated fabric comprising a frame, means carried by said frame for supporting said strip, a heater carried by said frame for heating said strip, strip corrugating means carried by said frame for receiving and shaping said heated strip including a revolvable cylinder having its outer wall corrugated wherein the axes of said corrugations extend axially of said cylinder, an endless conveyor belt having one side thereof corrugated, a resilient drive belt positioned to carry said conveyor belt in meshed engagement with said cylinder for a predetermined enwrapped distance, and drive means operatively connected to said resilient drive belt for maintaining successive meshed engagement between said corrugations to progressively feed the heated strip therethrough whereby to corrugate said strip.

HARRY C. ENGEL.
WILLARD W. TROXELL.
THEODORE P. PAJAK.

REFERENCES CITED

The following references are of record in the file of this patent:

UNITED STATES PATENTS

| Number | Name | Date |
|---|---|---|
| 785,786 | Wolff | Mar. 28, 1905 |
| 1,565,532 | Tupper | Dec. 15, 1925 |
| 2,300,760 | Amigo | Nov. 3, 1942 |
| 2,494,642 | Case et al. | Jan. 17, 1950 |
| 2,518,164 | Meyer | Aug. 8, 1950 |

FOREIGN PATENTS

| Number | Country | Date |
|---|---|---|
| 312,801 | Great Britain | June 6, 1929 |